United States Patent
Kishimoto et al.

(10) Patent No.: US 9,950,777 B2
(45) Date of Patent: Apr. 24, 2018

(54) VEHICLE CONTROL DEVICE AND METHOD OF CONTROLLING VEHICLE

(71) Applicant: Furuno Electric Co., Ltd., Nishinomiya (JP)

(72) Inventors: Kazuya Kishimoto, Nishinomiya (JP); Hitoshi Maeno, Nishinomiya (JP); Masashi Imasaka, Nishinomiya (JP); Yuya Takashima, Nishinomiya (JP); Chizu Kawasaki, Nishinomiya (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 149 days.

(21) Appl. No.: 15/017,336

(22) Filed: Feb. 5, 2016

(65) Prior Publication Data

US 2016/0229511 A1 Aug. 11, 2016

(30) Foreign Application Priority Data

Feb. 6, 2015 (JP) .................. 2015-022359

(51) Int. Cl.
- B63H 25/00 (2006.01)
- B63B 21/00 (2006.01)
- B63H 25/38 (2006.01)
- G05D 1/02 (2006.01)
- B63H 25/06 (2006.01)

(52) U.S. Cl.
CPC ............. *B63H 25/38* (2013.01); *B63H 25/06* (2013.01); *G05D 1/0206* (2013.01)

(58) Field of Classification Search
CPC .............................. B63H 25/38; G05D 1/0206
See application file for complete search history.

(56) References Cited

U.S. PATENT DOCUMENTS

| 5,152,239 A | 10/1992 | Hossfield et al. |
| 6,138,598 A * | 10/2000 | Askestad ............... B63H 25/00 |
| | | 114/230.1 |
| 2011/0010028 A1 | 1/2011 | Mizutani et al. |
| 2013/0276688 A1 * | 10/2013 | Ekuni ................... B63H 25/04 |
| | | 114/162 |
| 2016/0009351 A1 | 1/2016 | Hamamoto |

FOREIGN PATENT DOCUMENTS

| GB | 2424967 A | 10/2006 |
| WO | 2013121935 A1 | 8/2013 |
| WO | 2014065147 A1 | 5/2014 |

OTHER PUBLICATIONS

European Patent Office, Extended European Search Report Issued in Application No. 16154261.8, dated Jun. 20, 2016, Germany, 7 pages.

* cited by examiner

*Primary Examiner* — Adam D Tissot
(74) *Attorney, Agent, or Firm* — Alleman Hall Creasman & Tuttle LLP

(57) ABSTRACT

A vehicle control device is provided. The device includes a target bearing calculating module configured to calculate a target bearing of a vehicle based on a direction of a disturbance, a stern bearing calculating module configured to calculate a stern bearing, and a rudder mechanism drive signal determining module configured to determine a rudder angle command so that the stern bearing approaches the target bearing, and determine a rudder mechanism drive signal based on the rudder angle command.

16 Claims, 22 Drawing Sheets

| ParaL | 11 | 12 | 13 | 14 | 15 |
|---|---|---|---|---|---|
| Kp | 0.5 | 0.75 | 1.0 | 1.25 | 1.5 |
| Kd | 0.1 | 0.15 | 0.2 | 0.25 | 0.3 |
| THHkp | 2.5 | 3.75 | 5.0 | 6.25 | 7.5 |

| ParaL | 21 | 22 | 23 | 24 | 25 |
|---|---|---|---|---|---|
| Kp | 1.0 | 1.25 | 1.5 | 1.75 | 2.0 |
| Kd | 0.2 | 0.25 | 0.3 | 0.35 | 0.4 |
| THHkp | 10.0 | 12.5 | 15.0 | 17.5 | 20.0 |

FIG. 18

VEHICLE CONTROL DEVICE AND METHOD OF CONTROLLING VEHICLE

CROSS-REFERENCE TO RELATED APPLICATION(S)

This application claims priority under 35 U.S.C. § 119 to Japanese Patent Application No. 2015-022359, which was filed on Feb. 6, 2015, the entire disclosure of which is hereby incorporated by reference.

TECHNICAL FIELD

The present disclosure relates to a vehicle control device and a method of controlling a vehicle, which cause the vehicle to perform a particular maneuver in consideration of an influence of disturbances, such as a wind and a tidal current.

BACKGROUND

Fishing boats for single-hook fishing can improve an efficiency of fishing by fishing at a specific location or area where many target fish inhabit, such as fish reefs or shallows. Therefore, it is necessary to control the boat, for example, by fixing the boat at a point or causing the boat to move along a given drift fishing line.

Conventionally, such a boat control has been achieved by manually adjusting a rudder and a propulsion force (thrust) while a boat operator watches a motion of the boat. However, this method increases a burden of the operator.

Therefore, WO2013/121935A1 discloses an autopilot device which automatically sets a rudder angle in consideration of a disturbance (e.g., a wind).

However, the autopilot disclosed in WO2013/121935A1 may slow down the control speed over a change in magnitude and direction of the disturbance.

SUMMARY

Therefore, the purpose of this disclosure relates to providing a vehicle control device and a method of controlling a vehicle, which can maintain a posture of the vehicle more stably over a disturbance.

According to one aspect of this disclosure, a vehicle control device is provided. The vehicle control device includes a target bearing calculating module configured to calculate a target bearing of a vehicle based on a direction of a disturbance, a stern bearing calculating module configured to calculate a stern bearing, and a rudder mechanism drive signal determining module configured to determine a rudder angle command so that the stern bearing approaches the target bearing, and determine a rudder mechanism drive signal based on the rudder angle command.

With this configuration, a vehicle control is performed so that a stern of a vehicle body opposes to the direction of the disturbance. In a case of a boat, a boat body generally has a bow which is tapered to be narrower in a forward direction, and a stern with a flat wall. Further, a rudder of the boat is provided near a bottom of the stern. Because of this structure of the boat, when the bow opposes to the disturbance direction, the bearing of the boat body is easily changed by the disturbance. On the other hand, when the stern opposes to the disturbance direction, the bearing of the boat body is difficult to be changed by the disturbance. Therefore, by using this configuration, an influence of the disturbance against the boat can be reduced, and thus a stable boat control can be achieved.

According to this aspect of this disclosure, a posture of the vehicle can more stably be maintained over the disturbance.

BRIEF DESCRIPTION OF THE DRAWINGS

The present disclosure is illustrated by way of example and not by way of limitation in the figures of the accompanying drawings, in which like reference numerals indicate like elements and in which:

FIG. 18 illustrates tables of example parameters of the boat control device according to Embodiment 7;

DETAILED DESCRIPTION

Figure 1A:
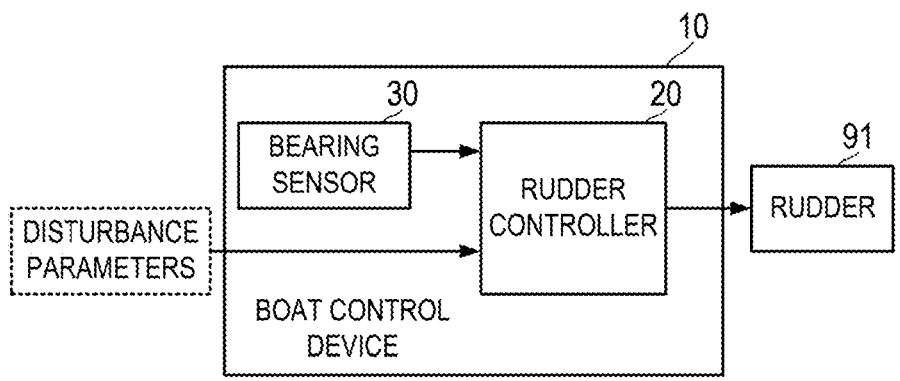
FIGS. 1A and 1B are block diagrams illustrating primary configurations of a boat control device and a rudder controller according to Embodiment 1 of the present disclosure, respectively.
Figure 1B:
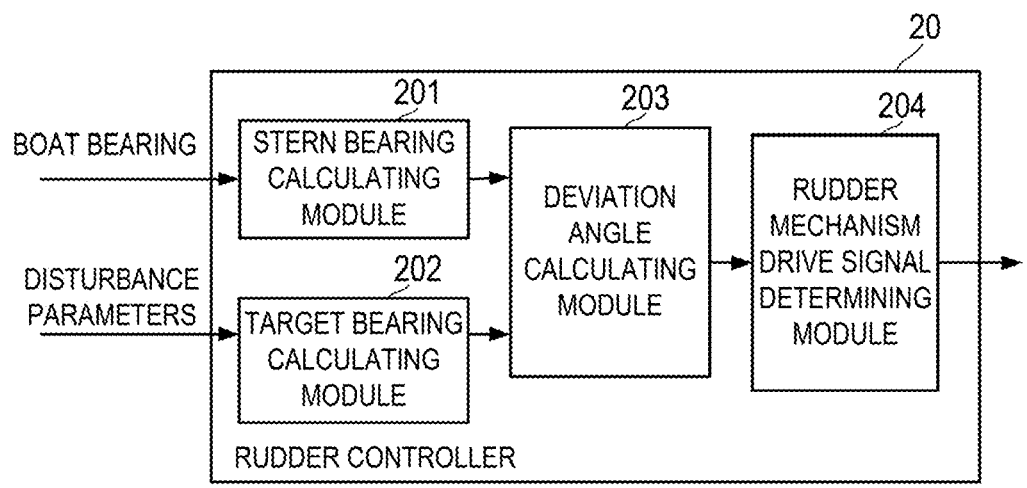
Figure 2:
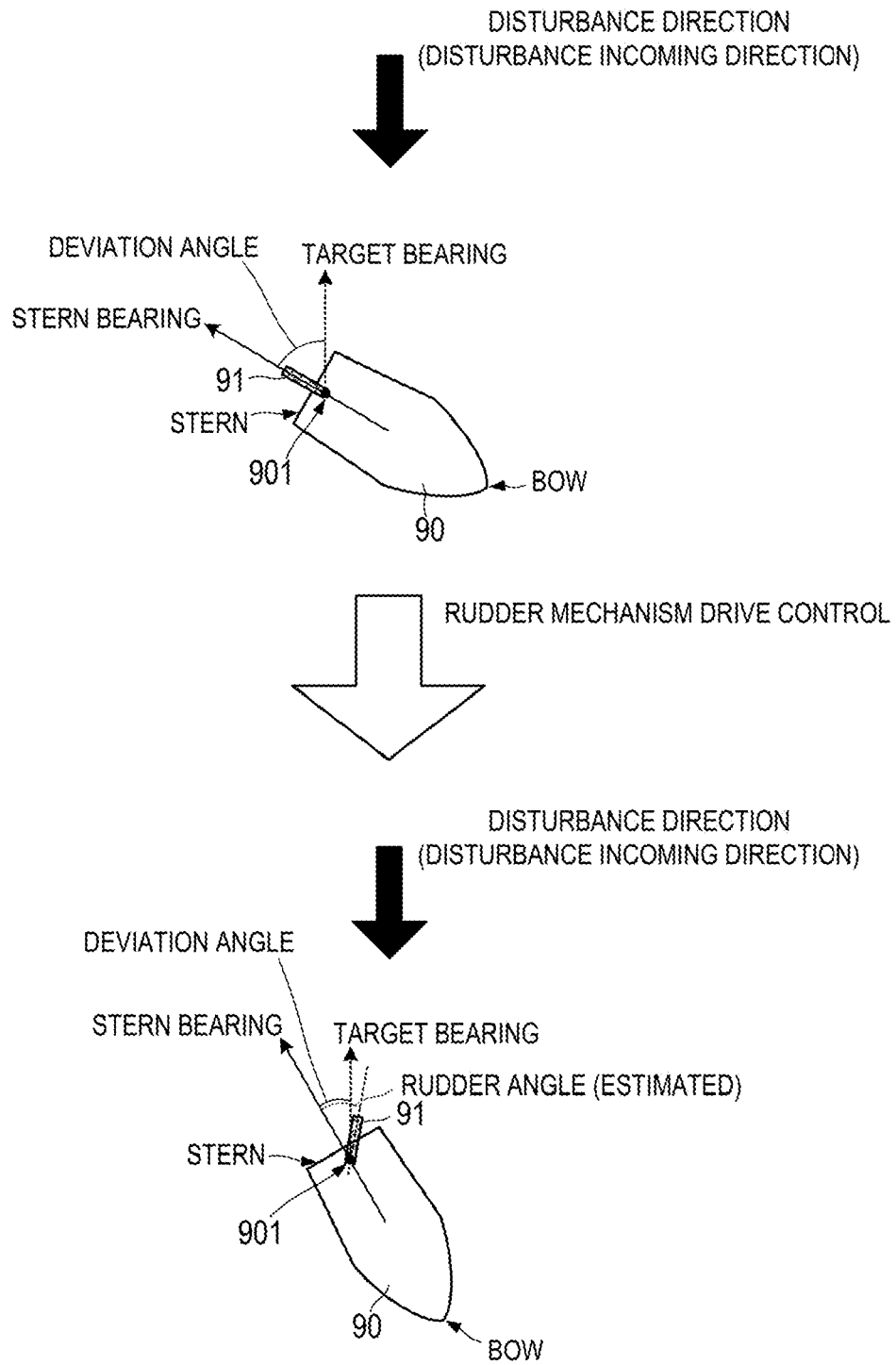
FIG. 2 illustrates views of a concept of a boat control executed by the boat control device according to Embodiment 1.

Hereinafter, a boat control device and a method of controlling a boat according to Embodiment 1 of the present disclosure are described with reference to the accompanying drawings. In the following embodiments, examples are illustrated in which the present disclosure is applied to a boat. However, the present disclosure may be applied to any kinds of vehicles having a rudder or similar steering device, such as other watercrafts including ships, vessels, and submarines, as well as land vehicles, airplanes and spaceships. Therefore, the term "boat" herein refers to one example of the vehicle in the claims. FIG. 1A is a block diagram illustrating a primary configuration of the boat control device according to Embodiment 1. FIG. 1B is a block diagram illustrating a primary configuration of a rudder controller of the boat control device. FIG. 2 illustrates views of a concept of a boat control executed by the boat control device.

As illustrated in FIG. 1A, the boat control device 10 includes a rudder controller 20 and a bearing sensor 30. Disturbance parameters, and a boat heading detected by the bearing sensor 30 are inputted into the rudder controller 20. The term "disturbance parameters" as used herein refers to a direction and a speed of a wind, a direction and a magnitude of a tidal current, etc. The rudder controller 20 generates a rudder mechanism drive signal by using the disturbance parameters and the heading, and outputs the rudder mechanism drive signal to the rudder 91. The rudder 91 changes a rudder angle according to the rudder mechanism drive signal.

Here, as illustrated in FIG. 2, the rudder controller 20 generates the rudder mechanism drive signal for adjusting the rudder angle so that a stern of a boat body 90 opposes to a direction of the disturbance. Such a boat control can prevent a turning of the boat body 90 due to the disturbance laterally with respect to the disturbance direction because the stern opposes to the disturbance direction (a disturbance incoming direction). The state where the boat body 90 turns laterally with respect to the disturbance direction means that directions of a line segment connecting a bow and a stern of the boat body 90 are oriented in substantially perpendicular directions to the disturbance direction.

Generally, the boat body 90 has a bow which is tapered to be narrower in a forward direction, and a stern with a flat wall, in consideration of a traveling performance thereof, etc. The rudder 91 is provided near the stern of the boat body 90. Therefore, a distance between the provided location of the rudder 91 and the stern is short, while a distance between the provided location of the rudder 91 and the bow is long.

Here, a fulcrum 901 of a turn of the boat body 90 is located at the provided location of the rudder 91. Therefore, if the disturbance direction changes and when the bow opposes to the disturbance direction, the boat body 90 is easily forced to be turned because of the influence of the change in the disturbance direction. On the other hand, if the disturbance direction changes and when the stern opposes to the disturbance direction, the influence on the boat body 90 is small and the boat body 90 is difficult to be turned.

Thus, by performing the boat control so that the stern of the boat body 90 opposes to the disturbance direction, the desired posture can be maintained more stably than the case where the bow opposes to the disturbance direction.

Figure 3:
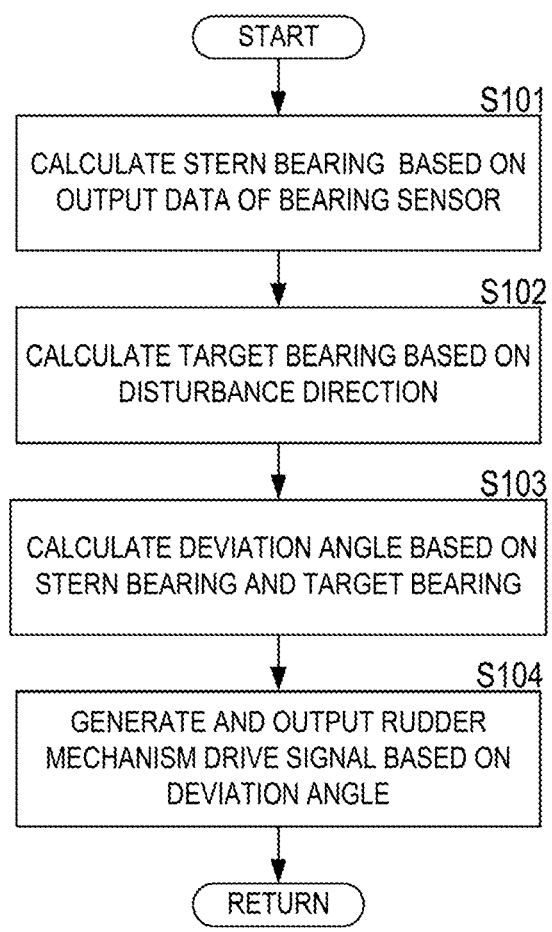
FIG. 3 is a flowchart illustrating a primary flow of the boat control according to Embodiment 1.

Next, a particular configuration and a particular method for performing such a boat control are described. FIG. 3 is a flowchart illustrating a primary flow of the boat control according to Embodiment 1.

As illustrated in FIG. 1B, the rudder controller 20 includes a stern bearing calculating module 201, a target bearing calculating module 202, a deviation angle calculating module 203, and a rudder mechanism drive signal determining module 204.

A boat bearing is inputted into the stern bearing calculating module 201 from the bearing sensor 30. The bearing sensor 30 is comprised of, for example, a satellite compass, and calculates the bearing (e.g., heading) of the boat body 90.

The stern bearing calculating module 201 calculates a stern bearing based on the boat heading (FIG. 3: S101). For example, if the heading has been calculated by the bearing sensor 30, the stern bearing calculating module 201 then calculates the stern bearing based on the heading, and outputs the stern bearing to the deviation angle calculating module 203. On the other hand, if the stern bearing has been calculated by the bearing sensor 30, the stern bearing calculating module 201 then outputs the stern bearing to the deviation angle calculating module 203 as it is.

The target bearing calculating module 202 acquires the disturbance direction from the disturbance parameters, calculates a target bearing which is opposite to the disturbance direction (i.e., a bearing toward the disturbance), and outputs the target bearing to the deviation angle calculating module 203 (FIG. 3: S102).

The deviation angle calculating module 203 calculates an angle of deviation (refer to FIG. 2) by calculating a difference between the stern bearing and the target bearing, and outputs the deviation angle to the rudder mechanism drive signal determining module 204 (FIG. 3: S103).

The rudder mechanism drive signal determining module 204 generates a rudder mechanism drive signal based on the angle of deviation, and outputs the rudder mechanism drive signal to the rudder 91 (FIG. 3: S104).

Figure 4:
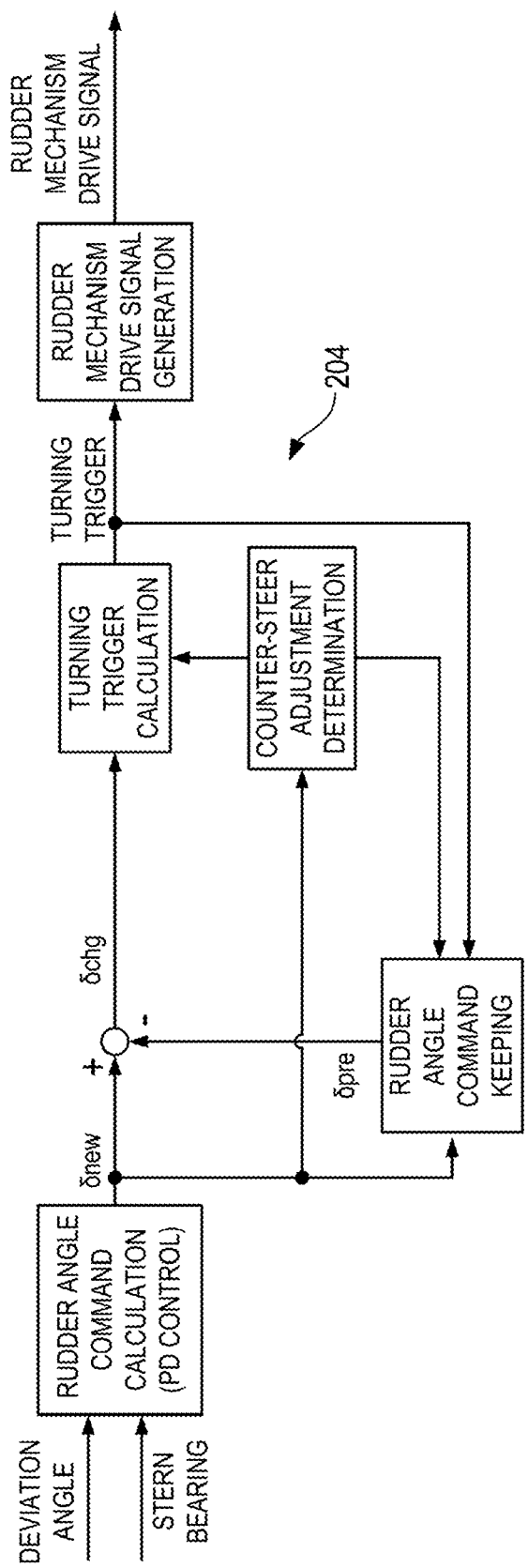
FIG. 4 is a control block diagram of a rudder mechanism drive signal determining module according to Embodiment 1.

The rudder mechanism drive signal determining module 204 generates the rudder mechanism drive signal by executing the following processing. FIG. 4 is a control block diagram illustrating the rudder mechanism drive signal determining module 204 according to Embodiment 1. Note that each control block illustrated in FIG. 4 may be executed by separate functional modules.

As illustrated in FIG. 4, the rudder mechanism drive signal determining module 204 calculates a rudder angle command $\delta_{new}$ based on the angle of deviation and the stern bearing. For example, the rudder mechanism drive signal determining module 204 calculates the rudder angle command δnew by a PD control. If using the PD control, the rudder mechanism drive signal determining module 204 calculates a proportional rudder angle by performing a proportional (P) control to the angle of deviation, and performs a derivative (D) control to a turning angular velocity which is calculated based on an amount of change in the stern bearing to calculate a differentiated rudder angle. The rudder mechanism drive signal determining module 204 calculates the rudder angle command δnew by adding the differentiated rudder angle to the proportional rudder angle. The rudder mechanism drive signal determining module 204 stores the calculated rudder angle command δnew.

The rudder mechanism drive signal determining module 204 calculates an amount of change δchg in the rudder angle command based on a rudder angle command δnew calculated this time (current rudder angle command) and a rudder angle command δpre which is calculated and stored last time (previous rudder angle command). Specifically, the rudder mechanism drive signal determining module 204 calculates the amount of change δchg in the rudder angle command by subtracting the previous rudder angle command δpre from the current rudder angle command δnew.

Figure 5:
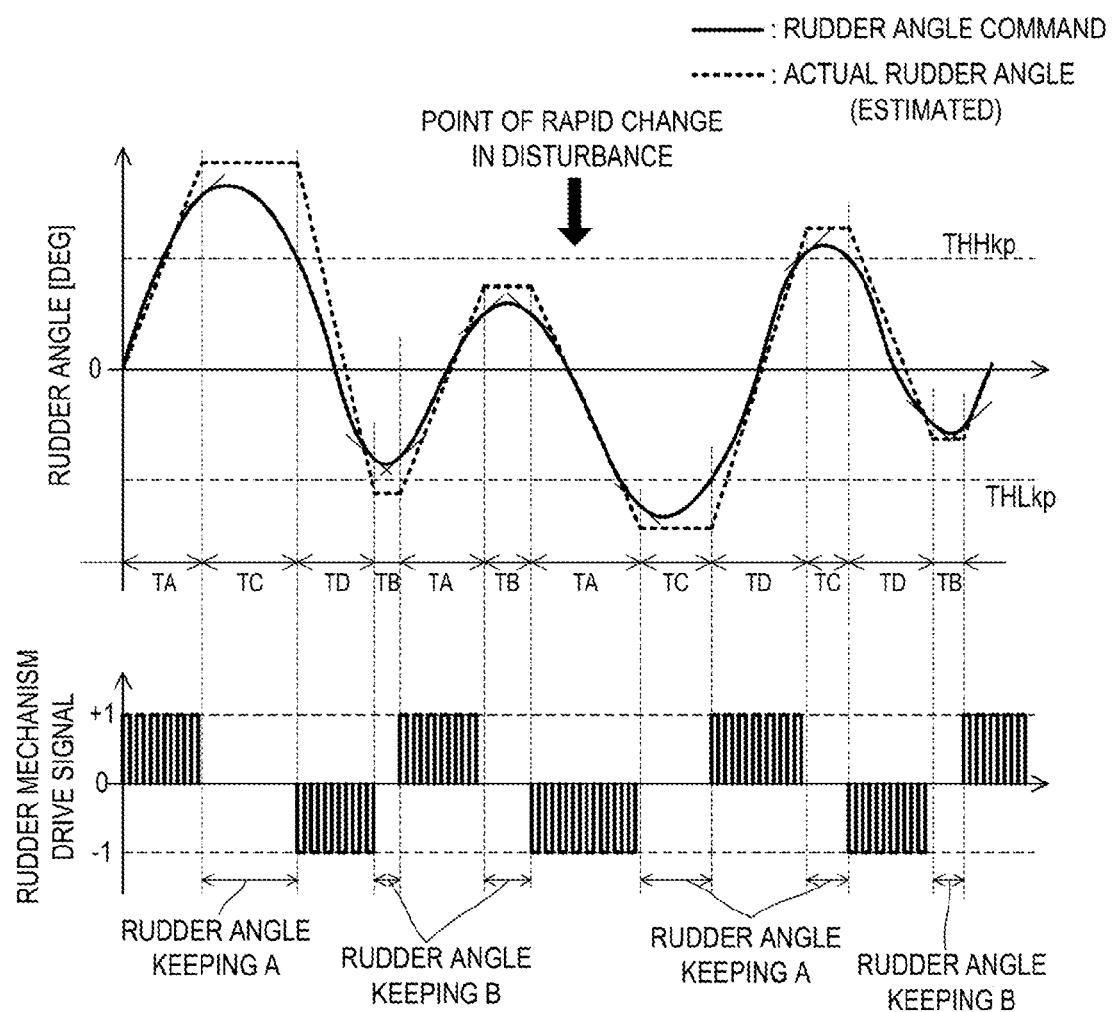
FIG. 5 illustrates charts of transitions of a rudder angle command and an actual rudder angle (estimation), and a ripple of a rudder mechanism drive signal, in the boat control device according to Embodiment 1.

As illustrated in FIG. 5, when the processing of the boat control device 10 is used, the rudder mechanism drive signal is fundamentally outputted during a period in which an absolute value of the amount of change δchg in the rudder mechanism drive signal is greater than a first threshold (i.e., a period TA in FIG. 5).

Further, when the processing of the boat control device 10 is used, the rudder mechanism drive signal is not fundamentally outputted during a period in which the absolute value of the amount of change δchg in the rudder angle command is less than the first threshold (i.e., a period TB in FIG. 5: a rudder angle keeping B).

The rudder mechanism drive signal determining module 204 performs a counter-steer adjustment based on the current rudder angle command δnew and the amount of change δchg in the rudder angle command. The term "counter-steer adjustment" as used herein refers to a determination of whether a turning is to be started or a turning is to be prohibited based on the magnitude of the rudder angle command and the amount of change in the rudder angle command.

The rudder mechanism drive signal determining module 204 transits to the determination processing of the start or the temporary prohibition of turning if the amount of change δchg in the rudder angle command is greater than the first threshold THchg. The rudder mechanism drive signal determining module 204 executes a rudder angle keeping processing if the amount of change δchg in the rudder angle command is less than the first threshold THchg (i.e., a turning trigger is not generated and the rudder mechanism drive signal is not outputted).

The rudder mechanism drive signal determining module 204 prohibits the turning and does not generate the turning trigger (i.e., the rudder angle keeping is executed) if the amount of change δchg in the rudder angle command is greater than the first threshold THchg and if the current rudder angle command δnew is greater than an upper threshold THHkp, or the current rudder angle command δnew is less than a lower threshold THLkp.

The rudder mechanism drive signal determining module 204 generates the turning trigger if the amount of change δchg in the rudder angle command is greater than the first threshold THchg and if the current rudder angle command δnew is less than the upper threshold THHkp, or the current rudder angle command δnew is greater than the lower threshold THLkp. The turning trigger is stored similarly to the rudder angle command.

The rudder mechanism drive signal determining module 204 outputs the rudder mechanism drive signal during the generating period of the turning trigger. The term "rudder mechanism drive signal" as used herein refers to a single-pulse signal having a particular pulse length which is repeated at a particular interval. Thus, the rudder mechanism drive signal determining module 204 achieves the rudder mechanism drive signal by repeatedly outputting the single-pulse signal only during the generating period of the turning trigger.

In FIG. 5, charts of transitions of the rudder angle command and an actual rudder angle (estimation), and a ripple of the rudder mechanism drive signal, in the boat control device according to Embodiment 1 are illustrated.

When the processing of the boat control device 10 is used, the rudder mechanism drive signal is not outputted if the current rudder angle command δnew is greater than the upper threshold THHkp or if the current rudder angle command δnew is less than the lower threshold THLkp, even if the absolute value of the amount of change δchg in the rudder angle command is greater than the first threshold (a period TC in FIG. 5: the rudder angle keeping A).

Further, when the processing of the boat control device 10 is used, the rudder mechanism drive signal is outputted if the absolute value of the amount of change δchg in the rudder angle command is greater than the first threshold, and if the current rudder angle command δnew is less than the upper threshold THHkp or the current rudder angle command δnew is greater than the lower threshold THLkp (a period TD in FIG. 5).

As illustrated in FIG. 5, the actual rudder angle can be gradually brought close to 0° by using the processing of the boat control device 10. Further, as illustrated in FIG. 5, even if a rapid change in the disturbance occurs, it can be reduced that a difference between the stern bearing and the target bearing (the angle of deviation) changes rapidly in response to the influence of the disturbance by directing the stern so as to oppose to the disturbance direction, and the actual rudder angle can be gradually brought close to 0° by performing the above-described processing. Therefore, a stable boat control can be performed.

Note that, although the boat control, which combines individual functional blocks and control blocks, is performed in the above-described description, the entire boat control can also be achieved by a single processing unit. In such a case, the processing unit stores the following algorithm (flowchart) which is implemented by a computer program, and reads out and executes the program to achieve the boat control.

Figure 6:
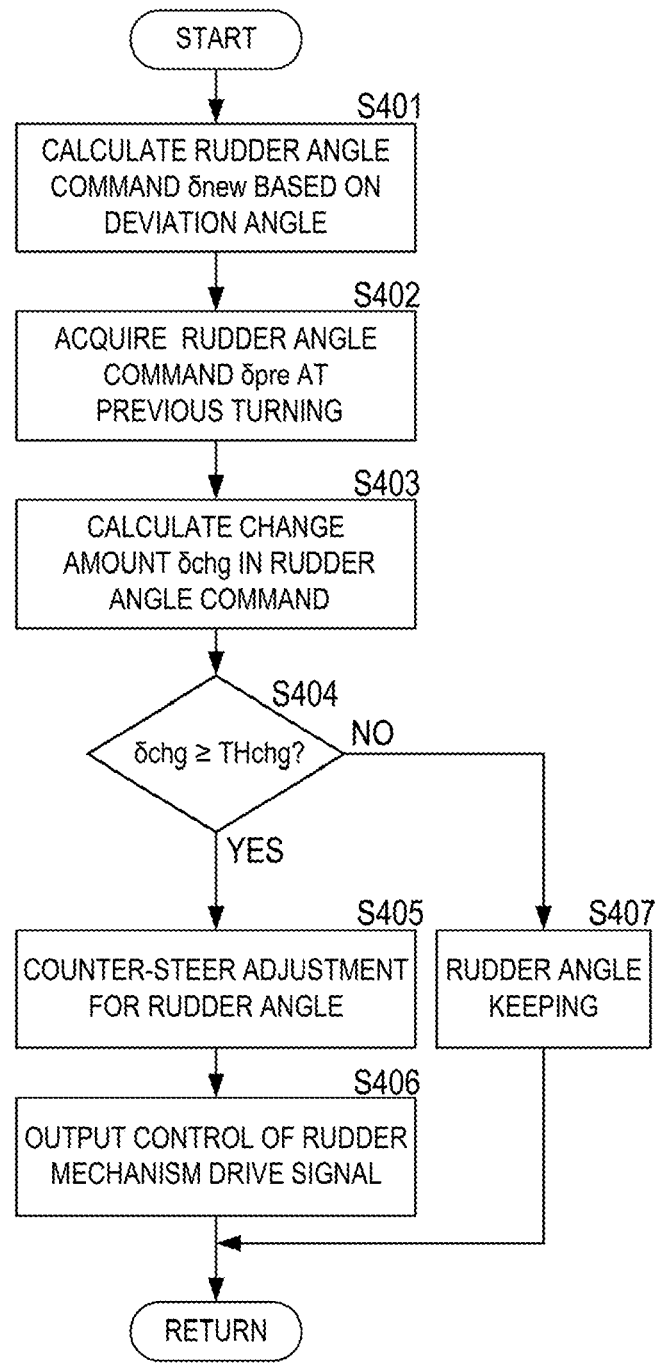
FIG. 6 is a flowchart illustrating a generation processing of the rudder mechanism drive signal according to Embodiment 1.

FIG. 6 is a flowchart illustrating a generation processing of the rudder mechanism drive signal according to Embodiment 1 of the present disclosure.

The processing unit of the boat control calculates the angle of deviation based on the stern bearing and the target bearing, and then calculates the rudder angle command δnew based on the angle of deviation (S401). The processing unit acquires the rudder angle command δpre at the time of the previous turning (S402). The processing unit calculates the amount of change δchg in the rudder angle command by subtracting the previous rudder angle command δpre from the current rudder angle command δnew (S403).

The processing unit stores a first threshold THchg for the rudder angle keeping. If the amount of change δchg in the rudder angle command is greater than the first threshold THchg (S404: YES), the processing unit executes the counter-steer adjustment for the rudder angle (a processing according to an algorithm illustrated in FIG. 7) (S405). The processing unit executes an output control of the rudder mechanism drive signal based on a result of the counter-steer adjustment for the rudder angle according to the algorithm of FIG. 7 (S406).

If the amount of change δchg in the rudder angle command is less than the first threshold (S404: NO), the processing unit executes the rudder angle keeping so as not to output the rudder mechanism drive signal (S407).

Figure 7:
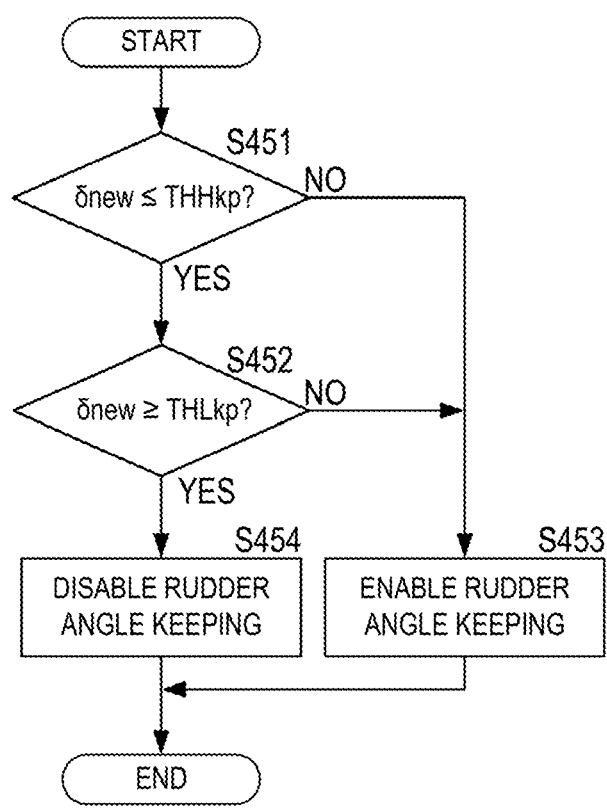
FIG. 7 is a flowchart illustrating a counter-steer adjustment processing of the rudder angle according to Embodiment 1.

Next, the counter-steer adjustment of the rudder angle is described. FIG. 7 illustrates a flowchart of the rudder angle counter-steer adjustment processing according to Embodiment 1.

The processing unit stores the upper threshold THHkp and the lower threshold THLkp for rudder angle keeping determination.

If the current rudder angle command δnew is less than the upper threshold THHkp (S451: YES) and if the current rudder angle command δnew is greater than the lower threshold THLkp (S452: YES), the processing unit disables the rudder angle keeping (S454). That is, the processing unit outputs the rudder mechanism drive signal.

The processing unit enables the rudder angle keeping (S453) if the current rudder angle command δnew is greater than the upper threshold THHkp (S451: NO), or if the current rudder angle command δnew is less than the lower threshold THLkp (S452: NO). That is, the processing unit does not output the rudder mechanism drive signal.

The above-described stable boat control can be achieved by executing such a processing.

Alternatively, the stable boat control can be achieved by using the configuration and the processing of this embodiment even if the rudder angle sensor is not used.

Embodiment 2

Next, a boat control device and a method of controlling a boat according to Embodiment 2 of the present disclosure are described with reference to the accompanying drawings. The boat control device and the method of controlling the boat according to this embodiment differ from the boat control device and the method of controlling the boat of Embodiment 1 in the function of the rudder mechanism drive signal determining module 204.

Figure 8:
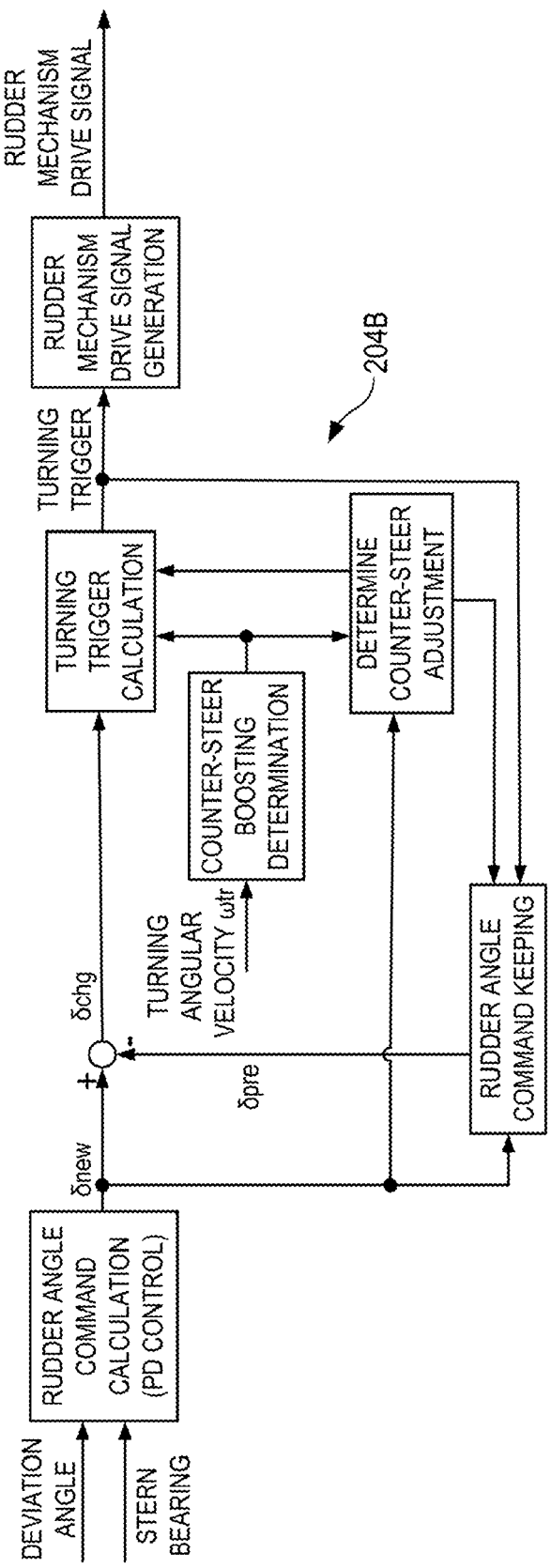
FIG. 8 is a control block diagram illustrating a rudder mechanism drive signal determining module in a boat control device according to Embodiment 2 of the present disclosure.

FIG. 8 is a control block diagram of a rudder mechanism drive signal determining module 204B in the boat control device according to Embodiment 2. The rudder mechanism drive signal determining module according to this embodiment is configured by adding a counter-steer boosting determination to the rudder mechanism drive signal determining module according to Embodiment 1.

The rudder mechanism drive signal determining module executes the counter-steer boosting determination based on a turning angular velocity ωtr. The turning angular velocity ωtr can be calculated, for example, based on a rate of change in the boat heading or stern bearing. The turning angular velocity ωtr is calculated using the stern bearing as a reference bearing, where a sign "+" is used when the boat turns in one of turning directions while a sign "−" is used when the boat turns in the other turning direction. The rudder mechanism drive signal determining module executes a counter-steer boosting if the turning angular velocity ωtr is greater than an upper threshold for the counter-steer boosting or less than a lower threshold for the counter-steer boosting. The rudder mechanism drive signal determining module suspends the counter-steer boosting if the turning angular velocity ωtr is less than the upper threshold for the counter-steer boosting or greater than the lower threshold for the counter-steer boosting.

If the rudder mechanism drive signal determining module determines that the counter-steer boosting is to be executed, it outputs a turning trigger so that a pulse length of single-pulse signals which constitute a rudder mechanism drive signal is longer and an interval of the single-pulse signals is narrower.

If the rudder mechanism drive signal determining module determines that the counter-steer boosting is to be suspended, it outputs the turning trigger which is reset to be initial settings by resuming the pulse length and the interval of the single-pulse signals which constitute the rudder mechanism drive signal. Note that this determination result of the counter-steer boosting is also applicable to a determination of the counter-steer adjustment, i.e., a determination of the rudder angle keeping.

Figure 9:
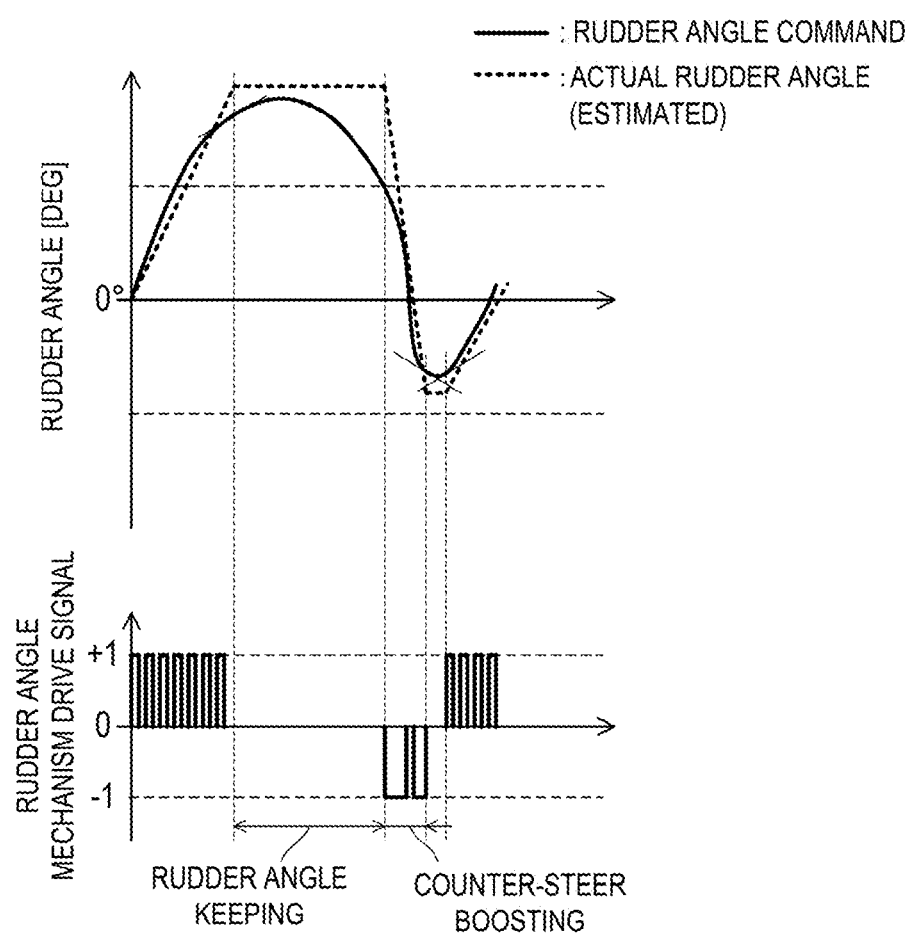
FIG. 9 illustrates charts of transitions of a rudder angle command and an actual rudder angle (estimation), and a ripple of a rudder mechanism drive signal, in a boat control device according to Embodiment 2.

FIG. 9 illustrates charts of transitions of a rudder angle command and an actual rudder angle (estimation), and a ripple of a rudder mechanism drive signal, in the boat control device according to Embodiment 2.

As illustrated in FIG. 9, the pulses which constitute the rudder mechanism drive signal are outputted for a longer period of time than that in a state of initialized settings during the period of the counter-steer boosting, by using a configuration and a processing of the boat control device of this embodiment. Therefore, a rudder 91 rotates quickly, and the boat can be controlled so that the actual rudder angle is quickly brought close to 0°. That is, the boat control can be carried out so that a stern bearing may be quickly brought in agreement with a target bearing.

Note that, similar to Embodiment 1, the boat control can be achieved by the processing unit storing a computer program which has an algorithm of the following flowchart, and reading out and executing the program also in this embodiment.

Figure 10:
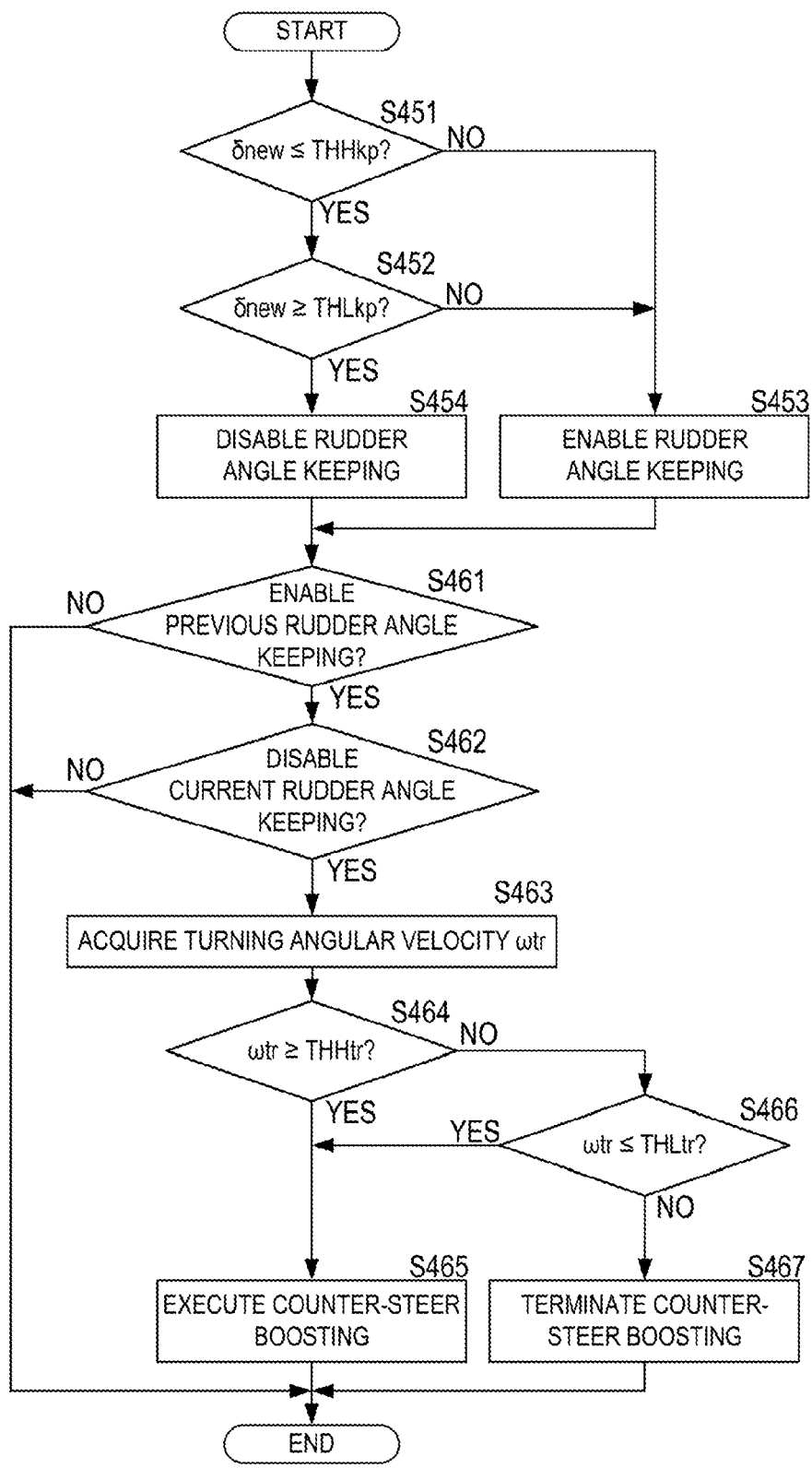
FIG. 10 is a flowchart illustrating a generation processing of the rudder mechanism drive signal according to Embodiment 2.

FIG. 10 is a flowchart illustrating a generation processing of the rudder mechanism drive signal according to Embodiment 2. Steps S451 to S454 in FIG. 10 are the same as those in FIG. 7 according to Embodiment 1.

The processing unit detects whether a previous rudder angle keeping is enabled. In addition, the processing unit also detects whether the current rudder angle keeping is disabled. If the previous rudder angle keeping is enabled (S461: YES) and if the current rudder angle keeping is disabled (S462: YES), the processing unit acquires the turning angular velocity ωtr (S463).

Here, the processing unit stores an upper threshold THHtr for the counter-steer boosting and a lower threshold THLtr for the counter-steer boosting in advance. If the turning angular velocity ωtr is greater than the upper threshold THHtr (S464: YES) or less than the lower threshold THLtr (S466: YES), the processing unit executes the counter-steer boosting (S465). If the turning angular velocity ωtr is less than the under upper threshold THHtr (S464: NO) and greater than the lower threshold THLtr (S466: NO), the processing unit terminates (suspends) the counter-steer boosting (S467).

Embodiment 3

Next, a boat control device and a method of controlling a boat according to Embodiment 3 of the present disclosure are described with reference to the accompanying drawings.

Figure 11:
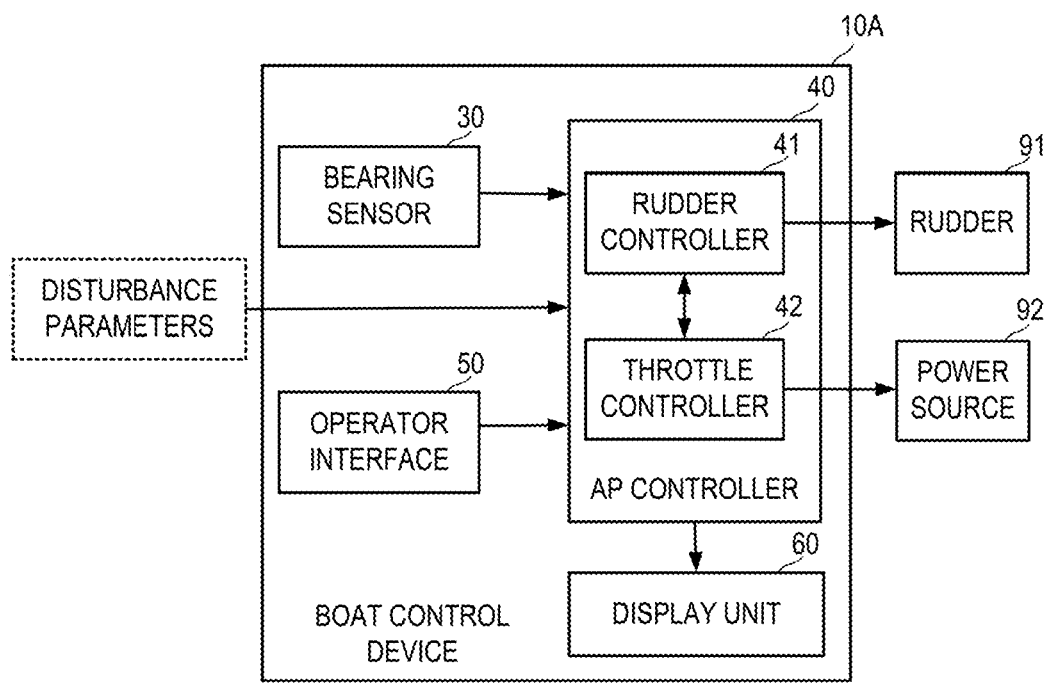
FIG. 11 is a block diagram illustrating a primary configuration of a boat control device according to Embodiment 3 of the present disclosure.

FIG. 11 is a block diagram illustrating a primary configuration of the boat control device according to Embodiment 3.

A boat control device 10A according to this embodiment is configured by adding configurations for an autopilot (AP) control and a throttle control to the boat control device 10 according to Embodiments 1 and 2.

The boat control device 10A includes a bearing sensor 30, an AP controller 40, an operator interface 50, and a display unit 60.

The AP controller 40 includes a rudder controller 41 and a throttle controller 42. The rudder controller 41 has the same configuration as the rudder controller 20 illustrated in the previous embodiments. The rudder controller 41 controls a rudder 91 automatically. The throttle controller 42 controls a power source 92 (e.g., an engine configured to generate a traveling thrust of the boat) according to operational inputs through the operator interface 50.

The operator interface 50 accepts the operational inputs of an operator of the boat. The operational inputs include a target location and a target bearing of the boat, for example. The operational inputs are outputted to the AP controller 40.

The display unit 60 has a configuration of presenting visual information to the operator, and is provided with a display screen which displays image(s), an indicator lamp, etc.

The AP controller 40 calculates a rudder angle and a thrust for the boat to reach a target location and a target bearing from a boat location, a boat heading, the target location and the target bearing which are obtained from a positioning device (not illustrated).

The rudder controller 41 of the AP controller 40 calculates a rudder angle command at each timing based on the calculated rudder angle, generates the rudder mechanism drive signal as described in the previous embodiments, and outputs the rudder mechanism drive signal to the rudder 91.

Figure 12:
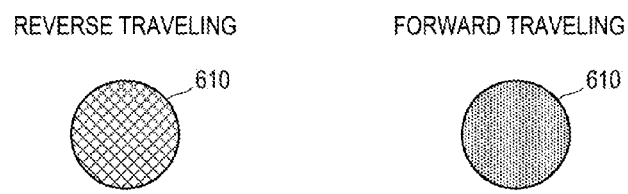
FIG. 12 is a view illustrating examples of a display mode for a throttle operation instruction of the boat control device according to Embodiment 3.

The AP controller 40 synchronizes with the rudder mechanism drive signal of the rudder controller 41 to display a throttle operation instruction on the display unit 60. FIG. 12 is a view illustrating examples of a display mode for the throttle operation instruction of the boat control device according to Embodiment 3.

As illustrated in FIG. 12, the display unit 60 is provided with the indicator lamp 610. The AP controller 40 synchronizes with the rudder mechanism drive signal to turn on or off the indicator lamp 610.

The AP controller 40 associates a timing at which a throttle is opened with a turn on of the indicator lamp 610, and associates a timing at which the throttle is choked with a turn off of the indicator lamp 610. That is, the AP controller 40 synchronizes with the rudder mechanism drive signal to turn on the indicator lamp 610 at a timing at which the thrust is to be increased. On the other hand, the AP controller 40 synchronizes with the rudder mechanism drive signal to turn off the indicator lamp 610 at a timing at which the thrust is to be decreased.

The operator operates a throttle operator interface of the operator interface 50 while looking at the display mode of the indicator lamp 610. The throttle controller 42 detects this throttle operation, and controls an output of the power source 92 according to the throttle operation.

With such a configuration described above, a start, an adjustment and a stop of the thrust of the power source 92 can be synchronized with the motion of the rudder 91. Thus, the boat control, such as causing the boat to travel to a target location, causing the boat to maintain at a target location, and directing the stern toward a target bearing (e.g., directing the stern so as to oppose to the disturbance), can be easily and surely performed.

Note that, as illustrated in FIG. 12, the display mode (e.g., a displaying color) may be changed between a forward and a backward (reverse) of traveling of the boat body 90. Therefore, the operator can perform a throttle operation more accurately.

Alternatively, the display mode may be changed according to a throttle opening, etc. For example, the display control may be performed so that a brightness of the indicator lamp 610 is increased as the throttle opening becomes larger. Therefore, the operator can perform the throttle operation still more accurately.

Note that although one example in which the power source 92 is manually controlled is illustrated in this embodiment, the power source 92 may be automatically controlled by the throttle controller 42 synchronizing with the rudder mechanism drive signal.

Embodiment 4

Next, a boat control device and a method of controlling a boat according to Embodiment 4 of the present disclosure are described with reference to the accompanying drawings. The boat control device according to this embodiment has the same configurations of the functional modules as the boat control device according to Embodiment 3, and is further provided with an auxiliary function for an operational input of the boat control.

The display unit 60 is provided with a touchscreen-type operator interface (hereinafter, referred to as "the touchscreen panel") in the boat control device of this embodiment. The boat control device accepts an operational input through the display unit 60, and performs the boat control for the autopilot control as described above.

Figure 13A:
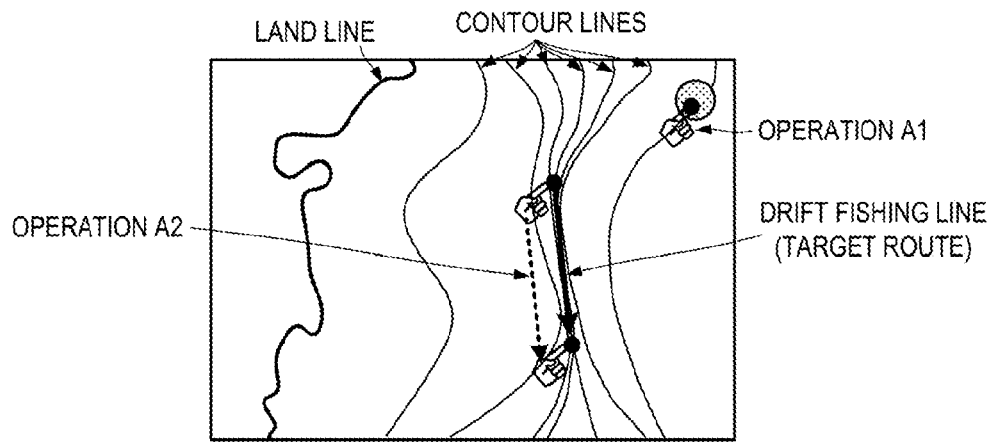
FIGS. 13A, 13B and 13C are views illustrating various input modes of a target route (drift fishing line) of a boat control device according to Embodiment 4 of the present disclosure.
Figure 13B:
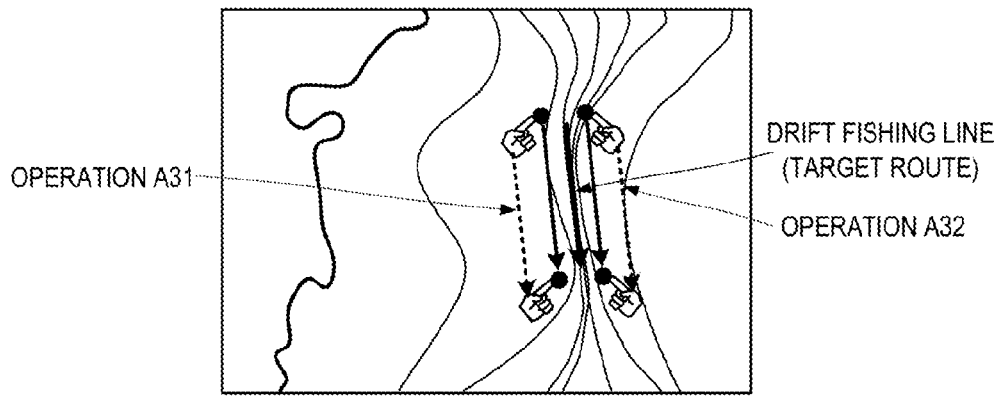
Figure 13C:
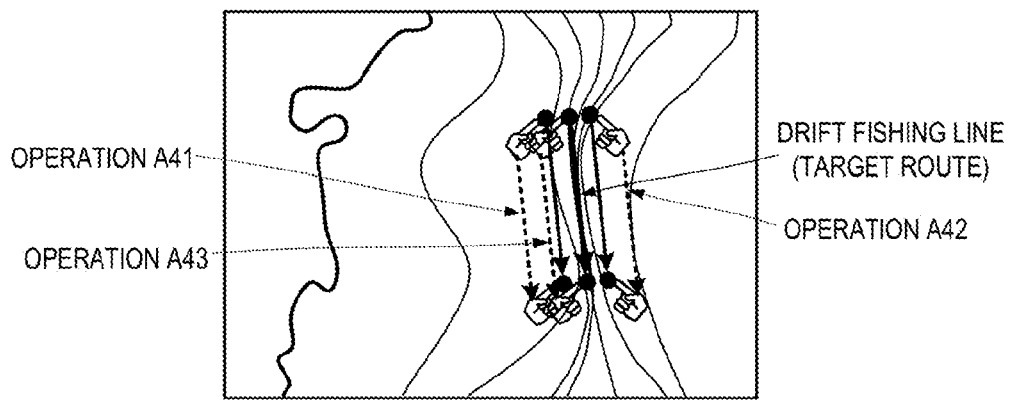
Figure 14:
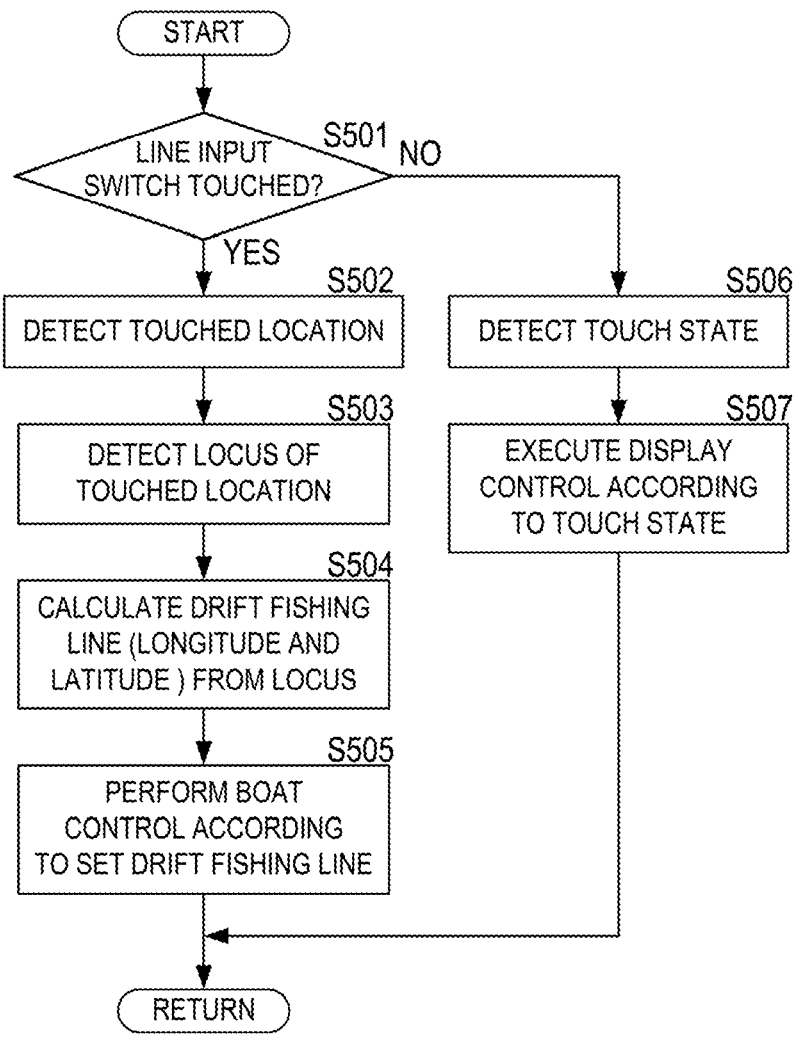
FIG. 14 is a flowchart illustrating an input processing of the target route (drift fishing line) of the boat which is executed by an AP controller of the boat control device according to Embodiment 4.

FIGS. 13A, 13B and 13C are views illustrating various input modes of a target route (drift fishing line) of the boat control device according to Embodiment 4. FIG. 14 is a flowchart illustrating an input processing of the target route (drift fishing line) of the boat which is executed by the AP controller of the boat control device according to Embodiment 4. FIG. 14 illustrates the input processing in a case of FIG. 13A.

As illustrated in FIGS. 13A to 13C, a chart is displayed on the display unit 60. The operator inputs a target route (drift fishing line) by the following procedure while looking at the chart, and the AP controller detects the input to set up the target route.

The AP controller detects whether a given location for a line input switch is touched based on the operational input to the touchscreen panel. As illustrated as an input operation A1 in FIG. 13A, if the given location of the line input switch is touched (S501: YES), the AP controller transits to a line input mode. If the given location of the line input switch is not touched (S501: NO), the AP controller accepts an operational input according to particular specifications of the operational input on the touchscreen panel.

When transited to the line input mode, the AP controller detects a touched location, and sets this location as a starting point of the drift fishing line (S502).

The AP controller detects a locus of touched locations (i.e., a line drawn by a movement of the touched location) when a touch is made as illustrated by an operation A2 in FIG. 13A to detect a change in coordinates of the drift fishing line (S503). The AP controller acquires a longitude and a latitude of the touched location in the chart when the touch is made, and calculates longitudes and latitudes of the drift fishing line (S504).

The AP controller acquires a location and a heading of the boat, and performs the above-described boat control so that the boat travels along the detected drift fishing line (S505).

Such a configuration and a processing allow the operator to easily set up the drift fishing line. Further, the operator's burden of the boat control can be reduced by controlling the boat to travel along the drift fishing line.

Note that, if the predetermined location of the line input switch is not touched (S501: NO), the AP controller detects a touch state on the touchscreen panel (S506), and executes a display control according to the touch state (S507). For example, if a touch input in response to an action corresponding to an enlarged displaying is detected, the currently displayed image is enlarged. Further, if a touch input in response to an action corresponding to a movement of an image in the display screen is detected, a range of the currently displayed nautical chart is shifted.

Such a configuration and a processing prevent an erroneous operational input in which the operator mistakes the input of the drift fishing line for the input of setting the image display mode, and vice versa.

The input of the drift fishing line may be carried out by methods illustrated in FIGS. 13B and 13C. In the method illustrated in FIG. 13B, the AP controller simultaneously detects two loci on the display screen (loci of operations A31 and A32 in FIG. 13B). The AP controller detects midpoints between the two loci, and sets a line connecting these midpoints as a drift fishing line. In the method illustrated in FIG. 13C, the AP controller simultaneously detects three loci on the display screen (loci of operations A41, A42 and A43 in FIG. 13C). The AP controller detects a middle locus of the three loci (locus of the operation A43 in FIG. 13C), and sets the middle locus as a drift fishing line.

Embodiment 5

Next, a boat control device and a method of controlling a boat according to Embodiment 5 of the present disclosure are described with reference to the accompanying drawings. The boat control device according to this embodiment has the same configurations for the functional modules as the boat control device according to Embodiment 3, and is further provided with an automatic switching function between a forward traveling mode and a reverse traveling mode.

Figure 15:
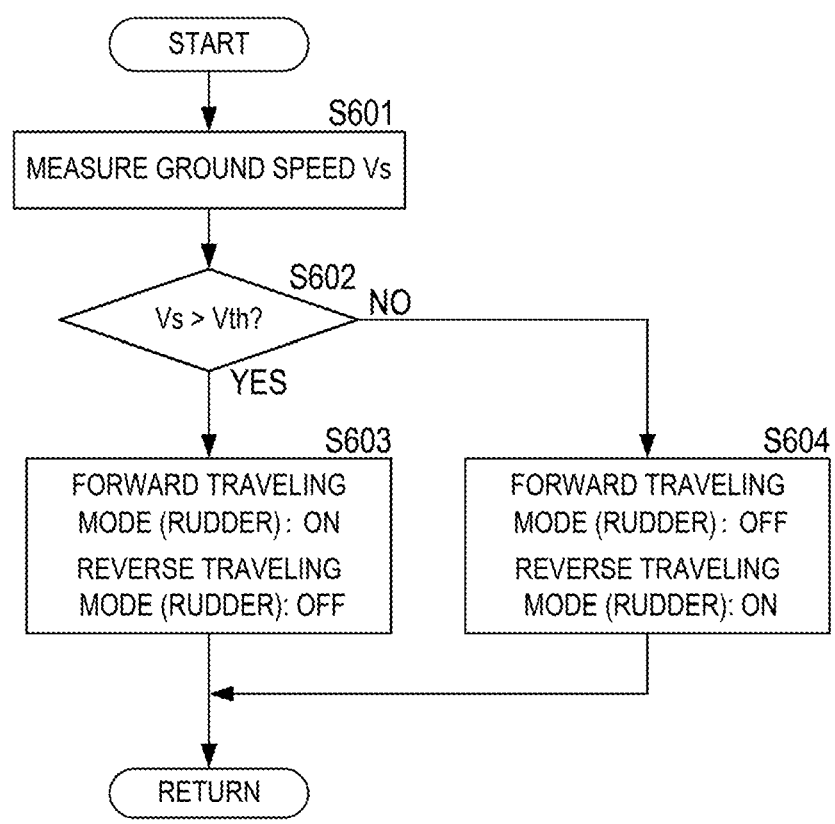
FIG. 15 is a flowchart illustrating an automatic switching processing between a forward traveling mode and a reverse traveling mode which is executed by a rudder controller of a boat control device according to Embodiment 5 of the present disclosure.

FIG. 15 is a flowchart illustrating an automatic switching processing between the forward traveling mode and the reverse traveling mode which is executed by a rudder controller of the boat control device according to Embodiment 5.

The rudder controller measures a ground speed Vs of the boat (S601). The ground speed Vs is measurable based on a rate of change in positioning result of the boat location. Here, the rudder controller is set to a manual standby mode at this moment.

The rudder controller compares the ground speed Vs with a mode switching threshold Vth. The mode switching threshold Vth is set based on the following concept, for example. When the boat travels forward (i.e., when the boat is propelled in the bow direction), it is in a normal traveling state and its traveling speed is generally fast (e.g., faster than 10 knots). On the other hand, when the boat travels rearward (i.e., when the boat is propelled in the stern direction), it is mostly under a fixed point maintaining control or a drift fishing line control and its traveling speed is slow (e.g., about 1 to 2 knots). Therefore, the mode switching threshold Vth is set lower than the traveling speed at the time of normal forward traveling and higher than the traveling speed at the time of reverse traveling.

If the ground speed Vs is greater than the mode switching threshold Vth (S602: YES), the rudder controller sets the direction mode of the rudder angle in the forward traveling mode (S603). On the other hand, if the ground speed Vs is below the mode switching threshold Vth (S602: NO), the rudder controller sets the direction mode of the rudder angle in the reverse traveling mode (S604). Here, the forward traveling mode is a mode in which the boat is propelled in the bow direction. The reverse traveling mode is a mode in which the boat is propelled in the stern direction.

Such a configuration and a processing allow the forward traveling and the reverse traveling to be detected without a sensor which detects the propelling direction being provided. Further, the steering direction of the rudder can be automatically changed according to the switching between the forward traveling and the reverse traveling. Therefore, the boat control can be automatically executed so that the boat becomes in a target posture (e.g., the stern bearing approaches the target bearing) without being conscious of the forward traveling or the reverse traveling. Further, it can be prevented that the operator steers the rudder in a wrong direction by mistaking the forward traveling for the reverse traveling, and vice versa.

Embodiment 6

Next, a boat control device and a method of controlling a boat according to Embodiment 6 of the present disclosure are described with reference to the accompanying drawings. The boat control device according to this embodiment has almost the same configurations for the functional modules to the boat control device according to Embodiment 5, but differs in the automatic switching function between the forward traveling mode and the reverse traveling mode.

In this embodiment, a propelling direction detector which detects a propelling direction is provided. The propelling direction detector is provided with a sensor which detects a connecting state of a clutch, a rotating direction of the propeller, etc., and detects the propelling direction based on an output from the sensor. The detection result of the propelling direction is outputted to a rudder controller.

Figure 16:
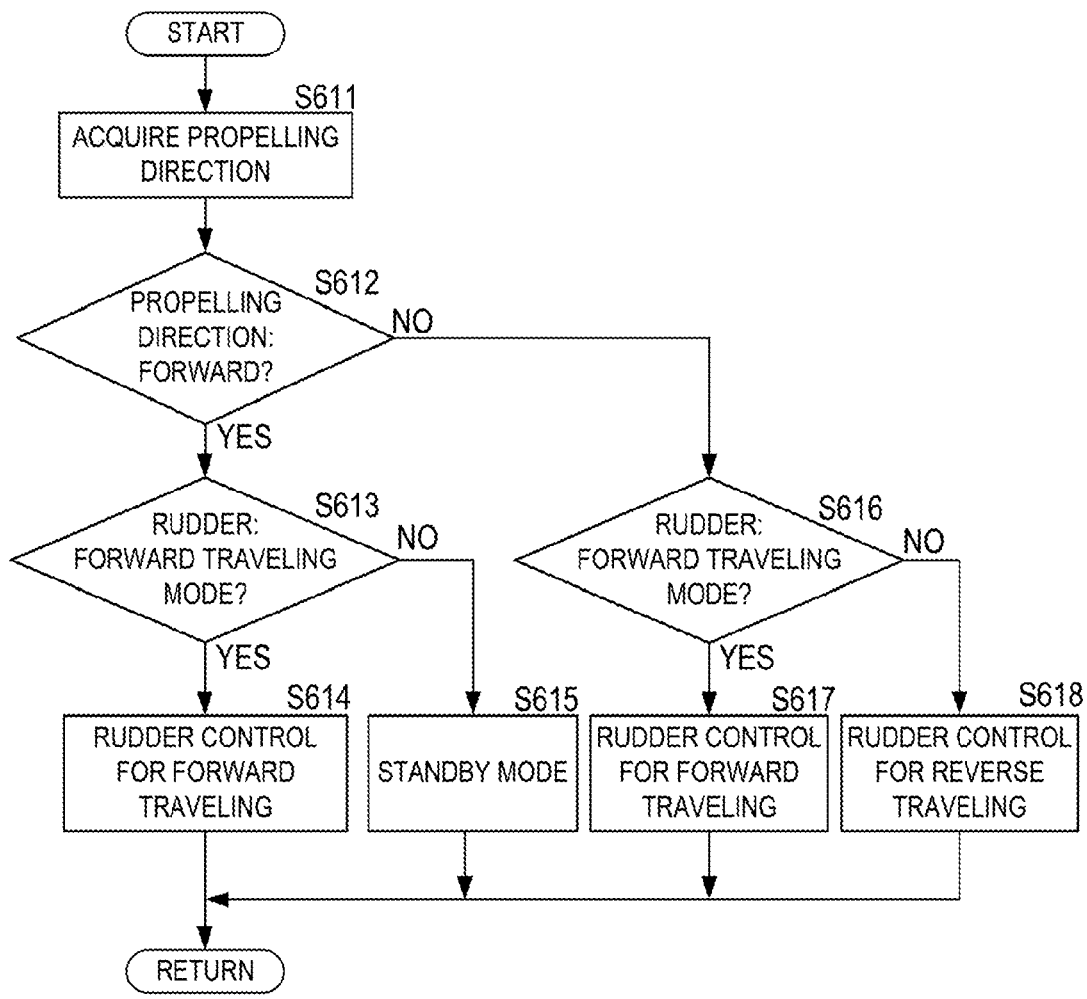
FIG. 16 is a flowchart illustrating an automatic switching processing between a forward traveling mode and a reverse traveling mode which is executed by a rudder controller of a boat control device according to Embodiment 6 of the present disclosure.

FIG. 16 is a flowchart illustrating an automatic switching processing between the forward traveling mode and the reverse traveling mode which is executed by the rudder controller of the boat control device according to Embodiment 6.

The rudder controller acquires a propelling direction (S611). If the propelling direction is a forward direction (S612: YES), the rudder controller then detects whether a rudder is in the forward traveling mode. If the forward traveling mode is set (S613: YES), the rudder controller executes a rudder control for forward traveling (S614). On the other hand, if the forward traveling mode is not set (S613: NO), the rudder controller transits to a standby mode (a manual steering mode of the rudder) (S615).

The rudder controller detects whether the rudder is in the forward traveling mode also when the propelling direction is not the forward direction (S612: NO). If the forward traveling mode is set (S616: YES), the rudder controller executes the rudder control for forward traveling (S617). On the other hand, if the forward traveling mode is not set (S616: NO), the rudder controller performs a rudder control for reverse traveling (S618).

Such a configuration and a processing also allow the steering to be switched automatically between the forward traveling and the reverse traveling. Therefore, similar to Embodiment 5, the boat control can be automatically performed so that the boat becomes in the target posture (e.g., a stern bearing approaches a target bearing), without being conscious of the forward traveling or the reverse traveling.

Embodiment 7

Next, a boat control device and a method of controlling a boat according to Embodiment 7 of the present disclosure are described with reference to the accompanying drawings. The boat control device according to this embodiment is configured by applying parameter settings for a rudder angle command calculation and for a rudder keeping which are described below to the previous embodiments, respectively (here, especially referring to Embodiment 1).

Figure 17:
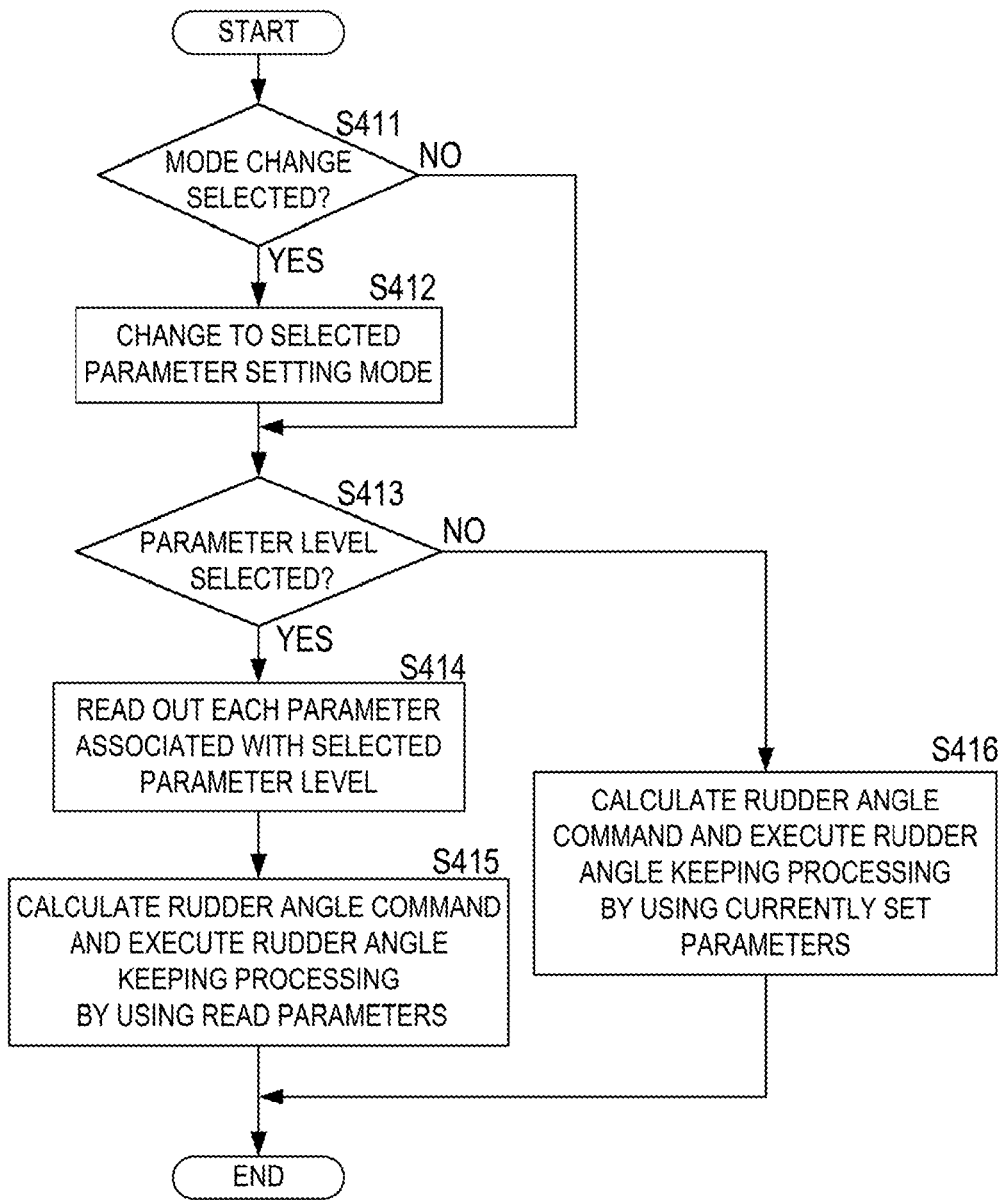
FIG. 17 is a flowchart illustrating a setting processing of parameters of a boat control device according to Embodiment 7 of the present disclosure.

FIG. 17 is a flowchart illustrating a setting processing of parameters of the boat control device according to Embodiment 7. FIG. 18 illustrates tables of example parameters of the boat control device according to Embodiment 7.

A rudder mechanism drive signal determining module accepts a mode selection of the parameters from an operator interface. Modes are classified according to effects of a rudder. For example, in this embodiment, the mode includes a normal mode, and an enhanced mode for the effect of the rudder is insufficient.

If the selected mode differs from a mode which has already been set, i.e., if a mode change is selected (S411: YES), the rudder mechanism drive signal determining module sets the selected mode as a newly selected mode (S412). On the other hand, if the mode change is not selected, the rudder mechanism drive signal determining module maintains the current mode.

The rudder mechanism drive signal determining module selects a parameter level which is set to the selected mode (S413: YES). There are a set of parameter levels which are associated with Kp, Kd and THHkp, respectively. Kp and Kd are coefficient parameters for a PD control which calculates a rudder angle command. Kp relates to a rudder angle, and Kd relates to a steering speed (a rate of change in the rudder angle). THHkp is a threshold for disabling the rudder angle keeping as described above. The parameters Kp and Kd are provided for every stage according to a magnitude of a disturbance. The parameter THHkp is set according to magnitudes of the parameters Kp and Kd.

The rudder mechanism drive signal determining module reads out the parameters Kp, Kd and THHkp which are associated with the selected parameter level (S414). The rudder mechanism drive signal determining module calculates a rudder angle command δnew using the PD control to which the parameters Kp and Kd are set. The rudder mechanism drive signal determining module executes a rudder angle keeping processing (a determination of enabling or disabling the rudder angle keeping) using the parameter THHkp (S415).

If the parameter level is not newly selected (S413: NO), the rudder angle command δnew is calculated using Kp and Kd which are currently set, and the rudder angle keeping processing is executed using THHkp which is also currently set (S416).

Such a processing allows a suitable rudder mechanism drive signal to be generated corresponding to the magnitude of the disturbance and, thus, a suitable boat control can be performed. For example, an angle of deviation between a stern bearing and a target bearing can be gradually brought close to 0° based on the magnitude of the disturbance without the angle of deviation being diverged. Therefore, the stern can oppose to the disturbance direction.

Further, since a plurality of kinds of parameter levels are provided according to the effects of the rudder, a suitable rudder mechanism drive signal corresponding to the effect of the boat rudder and the magnitude of the disturbance can be generated. Therefore, a suitable boat control can be performed.

Alternatively, in a case where such parameters are manually set, the PD control can be maintained at a comparatively stable state even if a thrust of the boat is cut irregularly by the boat speed (e.g., when the boat is maintained at a fixed point while the stern opposes to the disturbance direction). Therefore, the above-described processing is effective especially in a situation where the thrust is small, and a suitable boat control can be performed while reducing the operator's burden.

Note that although a mode where THHkp is set according to Kp and Kd is illustrated in this embodiment, angles used for other thresholds may also be set according to Kp and Kd.

Embodiment 8

Figure 19:
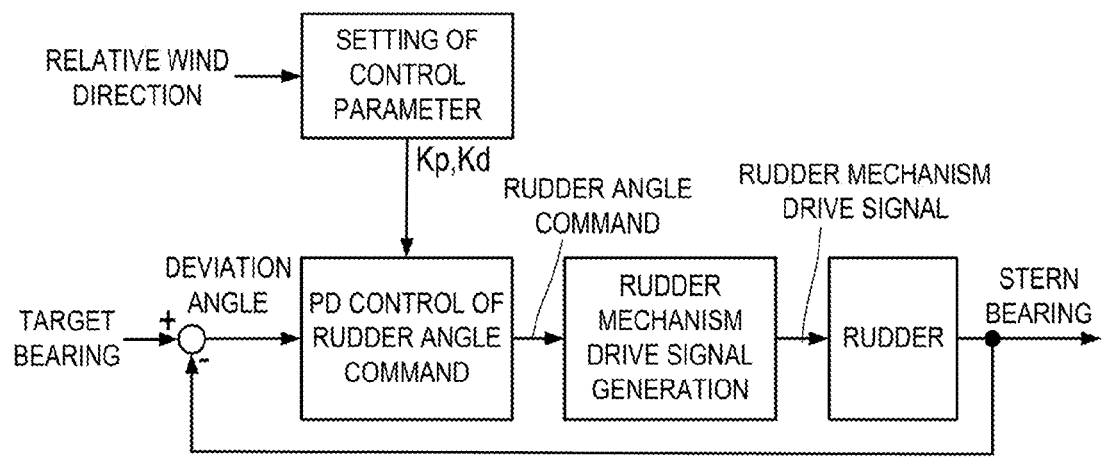
FIG. 19 is a control block diagram of a boat control device according to Embodiment 8 of the present disclosure.

Next, a boat control device and a method of controlling a boat according to Embodiment 8 of the present disclosure are described with reference to the accompanying drawings. The boat control device according to this embodiment is configured by applying a parameter setting for rudder angle command calculation described below to the previous embodiments, respectively (here, especially referring to Embodiment 1). FIG. 19 illustrates a control block diagram of the boat control device according to Embodiment 8.

As illustrated in FIG. 19, a rudder mechanism drive signal determining module of the boat control device of this embodiment calculates Kp and Kd which are used for a PD control of a rudder angle command which generates a rudder mechanism drive signal, by using an expression which considers a relative wind direction.

Figure 20:
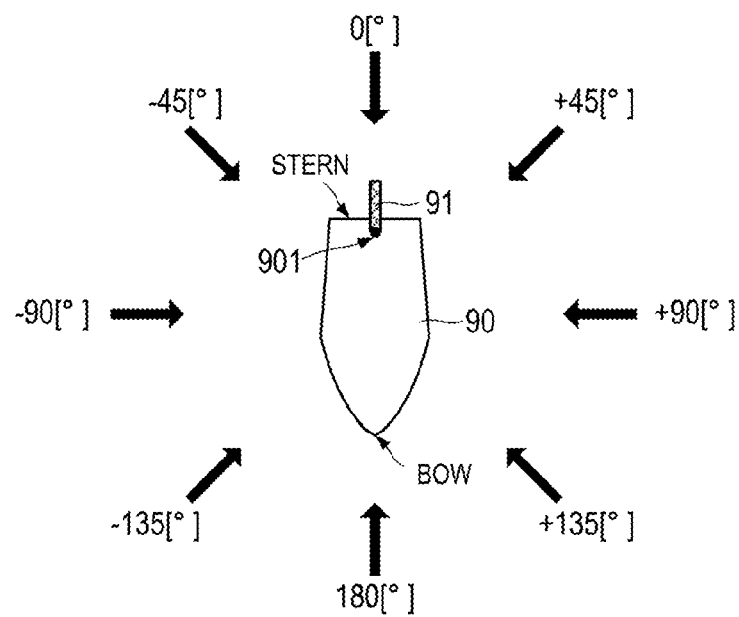
FIG. 20 is a view illustrating a definition of a relative wind direction in the boat control device according to Embodiment 8.

FIG. 20 is a view illustrating a definition of the relative wind direction for the boat control device according to Embodiment 8. As illustrated in FIG. 20, in the boat control device of this embodiment, a direction which opposes to a stern of a boat body 90 is 0° in the relative wind direction, and a direction which opposes to a bow of the boat body 90 is 180° in the relative wind direction. Further, directions at a port side of the boat body 90 are indicated with positive signs (+), and directions at a starboard side are indicated with negative signs (−).

The rudder mechanism drive signal determining module sets up Kp and Kd using the following equations.

$$Kp = Kp_{def} + Cp \times AWA$$

$$Kd = Kd_{def} + Cd \times AWA$$

Here, $Kp_{def}$ is a proportional coefficient at the time of 0° in the relative wind direction (when the stern opposes to a windward), and $Kd_{def}$ is a differential coefficient at the time of 180° in the relative wind direction (when the bow opposes to a windward). Cp and Cd are correction coefficients and are suitably set based on a magnitude of a disturbance, the size of the boat, and an effect of a rudder. Further, AWA is a wind direction.

Such a processing allows Kp and Kd to be set before the boat is influenced by a wind, not after the boat is influenced by the wind. Thus, since a feedback of setting parameters is not performed for the PD control, a delay due to an adaptation of the parameters can be improved. Therefore, the boat control can be carried out by quickly setting the rudder angle command according to the wind which the boat receives.

Embodiment 9

Next, a boat control device and a method of controlling a boat according to Embodiment 9 of the present disclosure are described with reference to the accompanying drawings. The boat control device according to this embodiment basically has the same configuration and processing for the boat control as those of the boat control devices described in the previous embodiments, and utilizes a method of determining a target bearing and a target thrust based on disturbance parameters as described below.

Figure 21:
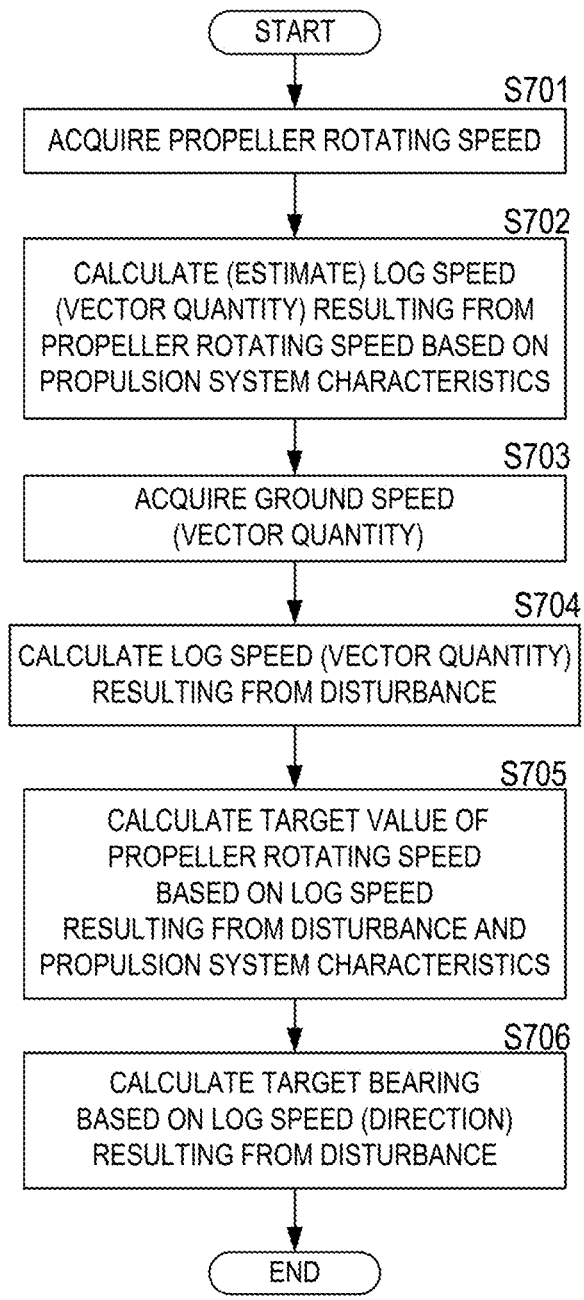
FIG. 21 is a flowchart illustrating a target bearing calculating method of a boat control device according to Embodiment 9 of the present disclosure.
Figure 22A:
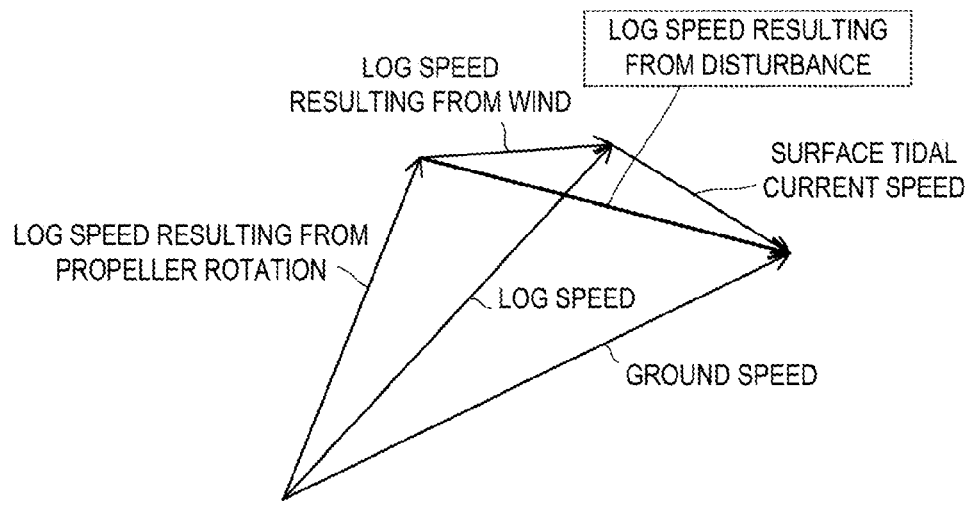
FIGS. 22A and 22B are views illustrating a calculation concept of a target bearing and a target value of a propeller rotating speed of the boat control device according to Embodiment 9.
Figure 22B:
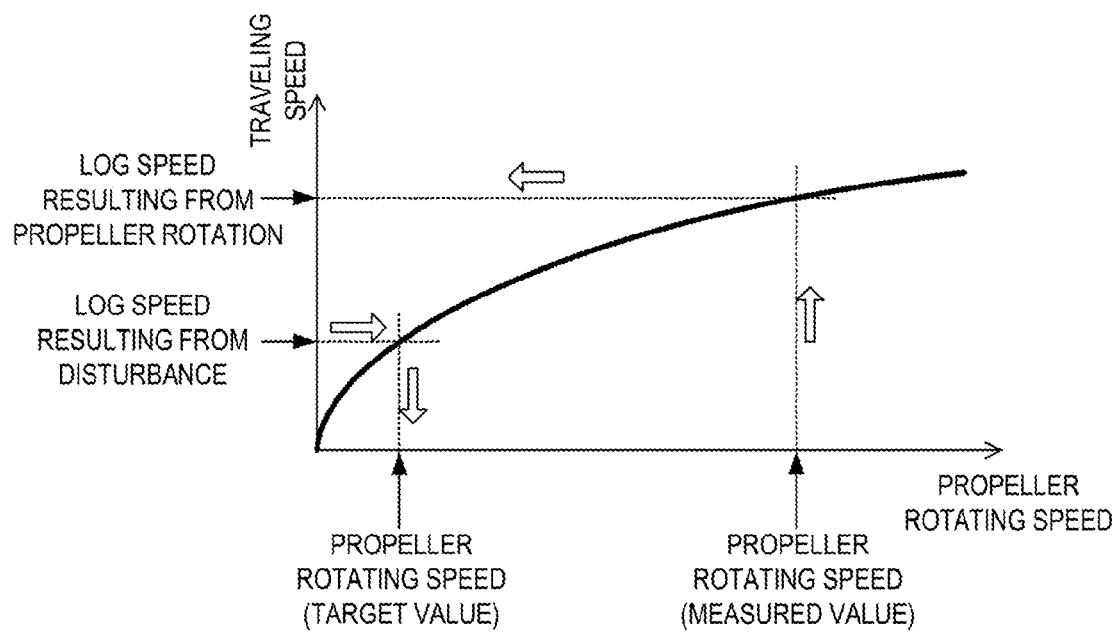

FIG. 21 is a flowchart illustrating a method of calculating the target bearing for the boat control device according to Embodiment 9. FIGS. 22A and 22B are views illustrating a calculation concept of a target bearing and a target value of a propeller rotating speed of the boat control device according to Embodiment 9. Here, FIG. 22A illustrates a vector relation diagram of respective boat speeds, and FIG. 22B is a view illustrating a concept of calculating the boat speed and the propeller rotating speed based on characteristics of a propulsion system of the boat.

A rudder mechanism drive signal determining module acquires a rotating speed of a propeller (S701). The propeller rotating speed is detected by a propeller rotating speed detector which is additionally provided to the boat.

As illustrated in FIG. 22B, the rudder mechanism drive signal determining module calculates (estimates) a log speed (vector quantity) of the boat resulting from the propeller rotation, based on the detected propeller rotating speed and the propulsion system characteristics (S702). The direction of the vector can be calculated based on a boat heading (a stern direction or a heading).

The rudder mechanism drive signal determining module calculates a ground speed (vector quantity) based on a positioning result as described above (S703).

As illustrated in FIG. 22A, a log speed of the boat can be expressed as a resultant vector of adding a vector of the log speed resulting from the propeller rotation to a vector of a log speed resulting from a wind. Further, the ground speed can be expressed as a resultant vector of adding the vector of the log speed to a vector of a surface tidal current speed. Therefore, a log speed resulting from a disturbance can be expressed as a resultant vector of adding the vector of the log speed resulting from the wind to the vector of the surface tidal current speed.

By using this relation, the rudder mechanism drive signal determining module calculates the vector of the log speed resulting from the disturbance (refer to FIG. 22A) based on a difference between the vector of the ground speed and the vector of the log speed resulting from the propeller rotating speed (S704).

As illustrated in FIG. 22B, the rudder mechanism drive signal determining module calculates the target value of the propeller rotating speed based on the log speed resulting from the disturbance and the propulsion system characteristics (S705). The AP controller including the rudder mechanism drive signal determining module gives an auxiliary notice of a throttle operation to an operator (e.g., a brightness adjustment of the indicator lamp 610 etc. described above) based on the target value of the propeller rotating speed.

The rudder mechanism drive signal determining module calculates a target bearing based on the direction of the log speed resulting from the disturbance (S706). The rudder mechanism drive signal determining module determines a rudder angle command based on the target bearing, and generates a rudder mechanism drive signal.

Such a configuration and a processing allow the magnitude and the direction of the disturbance which the boat receives (including an influence of a surface tidal current which is not easy to measure) to be calculated. Therefore, the target bearing and the target thrust can be set more accurately to perform a suitable boat control.

Note that although the fundamental boat control is to oppose the stern to the disturbance direction in the embodiments described above, the settings of the thresholds and the parameters, the display modes, and the settings of the target routes, the estimations of the disturbance, and the calculations of the target bearing are also applicable to a control in which the bow opposes to the disturbance direction. However, the configurations and processings of the present disclosure are more effective by adopting the boat posture in which the stern opposes to the disturbance direction. Therefore, the boat control can be performed more stably.

Further, in the embodiments described above, although the operator fundamentally controls the thrust (i.e., throttle control), the throttle control can be automated in a mode where a configuration and a processing for the throttle control are provided.

Further, although in the embodiments described above, the examples in which the PD control is performed to calculate the rudder angle command, a proportional (P) control may also be used.

<Terminology>

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

The invention claimed is:

1. A vehicle control device, comprising:
processing circuitry configured to:
calculate a target bearing of a vehicle based on a direction of a disturbance;
calculate a stern bearing; and
determine a rudder angle command so that the stern bearing approaches the target bearing, and determine a rudder mechanism drive signal based on a current rudder angle command, and an amount of change in the rudder angle command calculated based on a previous rudder angle command and the current rudder angle command, wherein
the processing circuitry is further configured to output the rudder mechanism drive signal when the amount of change in the rudder angle command is detected to be greater than a first threshold for a rudder angle keeping, and suspend the output of the rudder mechanism drive signal so that the rudder angle keeping is executed when the amount of change in the rudder angle command is detected to be less than the first threshold for the rudder angle keeping.

2. The vehicle control device according to claim 1, wherein when the amount of change in the rudder angle command is greater than the first threshold, the processing circuitry is further configured to suspend the output of the rudder mechanism drive signal so that the rudder angle keeping is enabled if the current rudder angle command is detected to be greater than an upper threshold for the rudder angle keeping or less than a lower threshold for the rudder angle keeping, and output the rudder mechanism drive signal so that the rudder angle keeping is disabled if the rudder angle command is detected to be less than the upper threshold for the rudder angle keeping or greater than the lower threshold for the rudder angle keeping.

3. The vehicle control device according to claim 2, wherein the processing circuitry is further configured to determine the rudder mechanism drive signal so that a rate of change in the rudder angle increases when a turning angular velocity of the stern is detected to be greater than an upper threshold for a counter-steer boosting or less than a lower threshold for the counter-steer boosting.

4. The vehicle control device according to claim 3, wherein the processing circuitry is further configured to set the rudder angle command according to a reverse traveling of the vehicle if a vehicle speed is detected to be less than a threshold for a determination of a forward traveling or a reverse traveling.

5. The vehicle control device according to claim 4, wherein the processing circuitry is further configured to determine a coefficient of a feedback control configured to calculate the rudder angle command based on a magnitude of the disturbance and a relative bearing of the disturbance with respect to the vehicle.

6. The vehicle control device according to claim 5, wherein the processing circuitry is further configured to calculate the target bearing based on characteristics of a propulsion system of the vehicle and a rotating speed of a propeller connected with the propulsion system.

7. A method of controlling a vehicle by means of a vehicle control device comprising processing circuitry, the method comprising:
calculating, via the processing circuitry, a target bearing of the vehicle based on a direction of a disturbance;
calculating, via the processing circuitry, a stern bearing; and
determining, via the processing circuitry, a rudder angle command so that the stern bearing approaches the target bearing, and determining a rudder mechanism drive signal based on a current rudder angle command, and an amount of change in the rudder angle command calculated based on a previous rudder angle command and the current rudder angle command, wherein
the determining the rudder mechanism drive signal includes outputting the rudder mechanism drive signal when the amount of change in the rudder angle command is detected to be greater than a first threshold for a rudder angle keeping, and suspending the outputting of the rudder mechanism drive signal so that the rudder angle keeping is executed when the amount of change in the rudder angle command is detected to be less than the first threshold for the rudder angle keeping.

8. The method according to claim 7, wherein when the amount of change in the rudder angle command is greater than the first threshold, the determining the rudder mechanism drive signal includes suspending the output of the rudder mechanism drive signal so that the rudder angle keeping is enabled if the current rudder angle command is detected to be greater than an upper threshold for the rudder angle keeping or less than a lower threshold for the rudder angle keeping, and outputting the rudder mechanism drive signal so that the rudder angle keeping is disabled if the rudder angle command is detected to be less than the upper threshold for the rudder angle keeping or greater than the lower threshold for the rudder angle keeping.

9. The method according to claim 8, wherein the determining the rudder mechanism drive signal includes determining the rudder mechanism drive signal so that a rate of change in the rudder angle increases when a turning angular velocity of the stern is detected to be greater than an upper threshold for a counter-steer boosting or less than a lower threshold for the counter-steer boosting.

10. The method according to claim 9, wherein the determining the rudder mechanism drive signal includes setting the rudder angle command according to a reverse traveling of the vehicle if a vehicle speed is detected to be less than a threshold for a determination of a forward traveling or a reverse traveling.

11. The method according to claim 10, wherein the determining the rudder mechanism drive signal includes determining a coefficient of a feedback control configured to calculate the rudder angle command based on a magnitude of the disturbance and a relative bearing of the disturbance with respect to the vehicle.

12. The vehicle control device according to claim 1, wherein the processing circuitry is further configured to set the rudder angle command according to a reverse traveling of the vehicle if a vehicle speed is detected to be less than a threshold for a determination of a forward traveling or a reverse traveling.

13. The vehicle control device according to claim 1, wherein the processing circuitry is further configured to determine a coefficient of a feedback control configured to calculate the rudder angle command based on a magnitude of the disturbance and a relative bearing of the disturbance with respect to the vehicle.

14. The vehicle control device according to claim 1, wherein the processing circuitry is further configured to calculate the target bearing based on characteristics of a propulsion system of the vehicle and a rotating speed of a propeller connected with the propulsion system.

15. The method according to claim 7, wherein the determining the rudder mechanism drive signal includes setting the rudder angle command according to a reverse traveling of the vehicle if a vehicle speed is detected to be less than a threshold for a determination of a forward traveling or a reverse traveling.

16. The method according to claim 7, wherein the determining the rudder mechanism drive signal includes determining a coefficient of a feedback control configured to calculate the rudder angle command based on a magnitude of the disturbance and a relative bearing of the disturbance with respect to the vehicle.

* * * * *